Patented Apr. 19, 1932

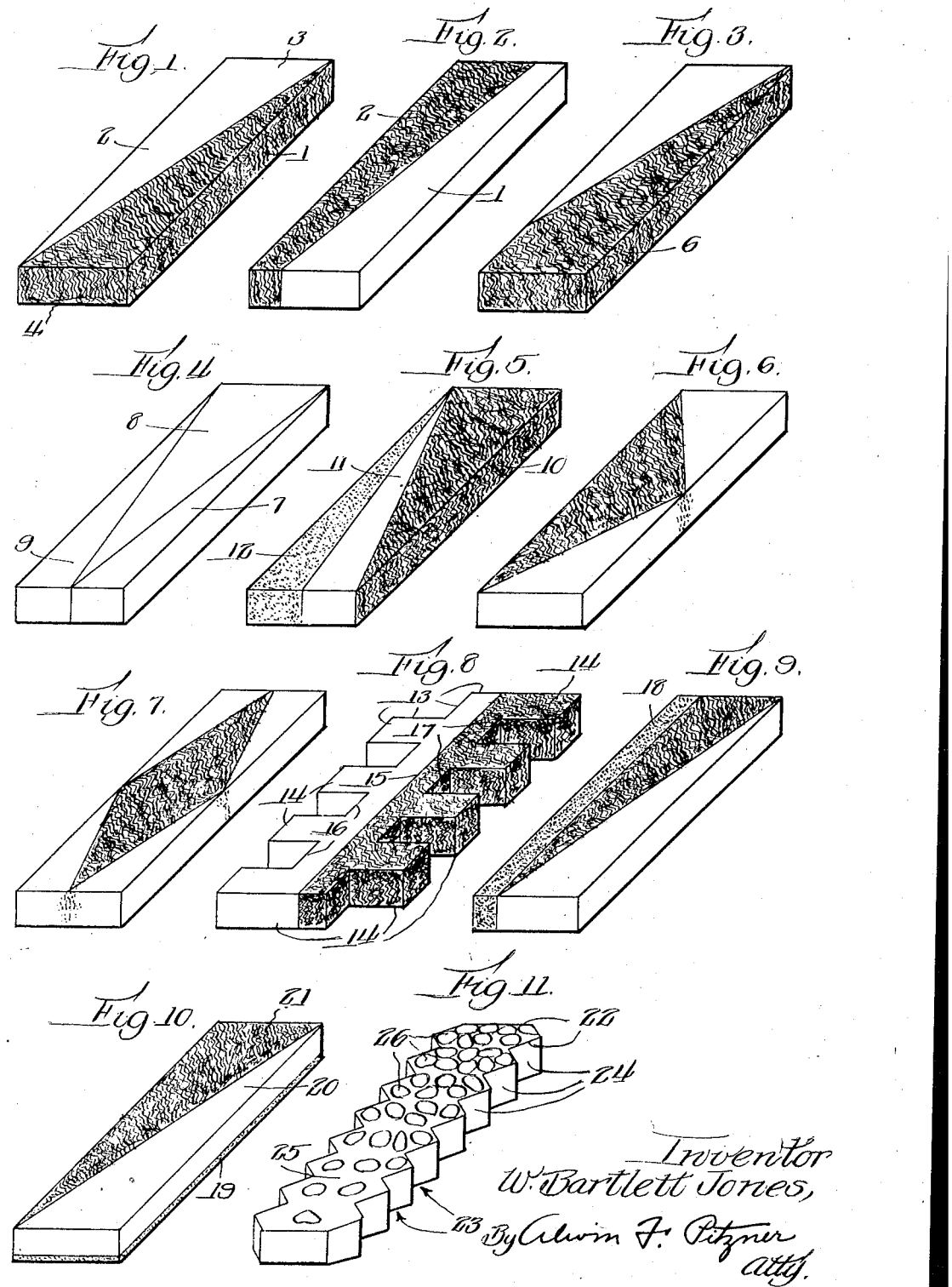

1,855,145

UNITED STATES PATENT OFFICE

W. BARTLETT JONES, OF CHICAGO, ILLINOIS

EDIBLE ARTICLE

Application filed December 2, 1926. Serial No. 152,085.

This invention relates generally to articles of food such as edible cakes, candies, ices, and the like, and it has particular reference to candy bars.

Usually such articles, especially chocolate bars, are made quite uniform in cross section and in composition along the length of the bar. It is a well known fact that the sense of taste becomes deadened, dulled, or perhaps better stated, it becomes saturated on eating a considerable amount of the same material in a short space of time, thus explaining the well known observation that the first bite of such a bar tastes better than the last. Inasmuch as articles of food such as candy bars, cakes and ices are customarily eaten within a relatively short space of time, it is desirable to supply them in the most enjoyable form. I take advantage of the tendency of the sense of taste to become saturated and impart to the article a form which to a large extent minimizes the saturation effect. This is accomplished by mixing with the particular food desired, one or more other foods, in such a manner that the eater under ordinary circumstances is compelled automatically by the form in which it is served, to partake of it in the manner contemplated by this invention.

One object of the invention is to provide a cake or bar in which the proportion of the preferred component material increases in successive "bites" along the bar.

Another object of the invention is to provide a cake or bar with two or more edible components, so arranged that at successive cross sections along the bar, corresponding to bites, a changed composition is encountered.

Still another object of the invention is to provide a two-component bar with sections so arranged that one component progressively decreases in proportion as the other increases in a direction endwise of the bar, and further so arranged that either end may be made the starting point for either component, according to the choice of the eater.

In the accompanying drawings Figs. 1 to 11 exemplify the invention in various embodiments and modifications. It is to be understood, however, that these forms do not limit the invention to the particular types herein shown and described, and that I contemplate all such cakes, bars and other arrangements as may be comprehended within the scope of the appended claims.

The simplest and the preferred form of the invention is shown in Fig. 1. This represents a rectangular bar of candy made from two component candy materials having different bases, such as chocolate 1 and coconut 2. Each portion or section is tapered and is herein shown as wedge-shaped. The two sections are so arranged that the dividing line is along a diagonal of the bar. The bar is represented as having a cross section sufficiently small to permit one to eat the bar endwise in successive bites along the length of the bar. Thus, if one prefers chocolate to coconut, one eats the bar beginning with the end 3 which has a minimum amount of chocolate. Otherwise one eats from the end 4 so that with each succeeding bite less chocolate is eaten and more coconut is enjoyed. In addition to the increasing proportion of the preferred component, one has the benefit of the varying mixtures of the two components that are encountered during the process of consuming the bar.

Fig. 2 represents a modified form of the bar in which the same principles are employed. In effect this bar is but a section between the ends of a bar like that of Fig. 1.

Fig. 3 represents a bar which may be described as the bar of Fig. 1 with one end extended and comprised of but one component, such as the solid end 6 of chocolate indicated.

In Fig. 4 the bar comprises three wedge sections 7, 8 and 9, each of which may be of different materials, or if desired, two sections may be of like materials.

In Fig. 5 there is shown another arrangement of a three section bar having, for example, chocolate 10, coconut 11 and caramel 12.

Various combinations of these bar types may be made as represented by Figs. 6 and 7. These bars are the equivalent of duplicate bars on the order of Figs. 1 and 4 respectively, formed integrally and end-to-end. When eating such a bar, one component first increases and then decreases in proportion to the other component.

A bar may also be made according to Fig. 8 in which the composition of successive bites increases and then decreases as regards one component. This may be effected by the provision of an irregular outline which primarily serves to divide the bar into bites. In the present instance the outline 13 may be considered as formed by staggering the bites 14. A straight boundary line between the sections is preferred in order to facilitate manufacture. In the present instance the boundary line 15 is located inwardly from the edges 16 of one type of bite and inwardly from the edges 17 of the other type of bite. By placing the boundary line 15 any place between the edges 16 and 17 the proportion of ingredients may be varied so as to permit either one or both types of bites to comprise wholly one component. Eating the bar of Fig. 8 results in an alternate change in composition. However, the progressive change in composition is preferred in order to take full advantage of the saturation property of the taste, and in addition to take advantage of the psychological effect of anticipating the enjoyment of the maximum proportion of the preferred component.

Various other embodiments are disclosed which need but a brief description. Fig. 9 shows a bar having a constant proportion of one material 18. Fig. 10 shows another bar having a constant proportion of one material formed as a base 19 upon which is placed any one of the other types of bar, such as the progressively changing composition 20—21.

Fig. 11 represents a bar having a maximum composition adapting it to be eaten endwise which cross section, nevertheless, is not uniform as a result of an irregular outline 22. The outline contains indentations in the form of notches 23 which divide the bar into bites 24. This bar of course may have the generally tapering sections as hereinabove described, but the same effect is obtained in a different manner. The various bites 24 are so constituted each within itself that the desired progressive change in proportion with successive bites is readily effected. Each bite differs in composition from the adjacent bite, and in the present instance, rather than being homogeneous in composition, each bite employs one component as a matrix 25 into which are fixed inserts 26 of one or more other components. Such inserts may be peanuts, for example, and preferably all the inserts are of the same component so that there is a progressive increase in one direction in the composition, say of peanuts. In the drawings the progressive increase in inserts is represented by one peanut in the first bite, two in the second, three in the third, etc.

It will be understood that this invention is not limited to candy bars and that it may be embodied in bricks of ice cream to be cut into slices similar to the illustrations, or in cakes to be sliced, or in cookies, chocolate coated ices, etc.

I claim:

1. An edible article in the form of a bar having a maximum cross sectional area adapting the bar to be eaten endwise, and having a plurality of component sections arranged along the length of the bar, one section being tapered lengthwise of the bar to permit the material of said section to increase in proportion in successive bites.

2. An article of food having a substantial length and a maximum cross section adapting the article to be eaten endwise, comprising a plurality of component sections of different materials arranged lengthwise, the size and arrangements of the sections being such that the proportion of one material varies progressively in successive bites.

3. An edible article comprising a series of small bodies of mixed foods, attached together in succession, each body being substantially a normal bite or mouthful, each set of adjacent bodies being different in composition and containing a common substance in different proportion, said substance changing progressively in proportion in the successive bodies.

In testimony whereof, I have hereunto affixed my signature.

W. BARTLETT JONES.